(12) United States Patent
Belyakov et al.

(10) Patent No.: US 11,348,741 B2
(45) Date of Patent: May 31, 2022

(54) ELECTROCHEMICAL DEVICE FOR STORING ENERGY

(71) Applicant: Geyser Batteries Oy, Helsinki (FI)

(72) Inventors: Aleksey Ivanovich Belyakov, Kursk (RU); Nelya Vasilievna Khodyrevskaya, Kursk (RU); Mikhail Serafimovich Zvyagintsev, Kursk (RU)

(73) Assignee: Geyser Batteries OY, Helsinki (FI)

( * ) Notice: Subject to any disclaimer, the term of this patent is extended or adjusted under 35 U.S.C. 154(b) by 0 days.

(21) Appl. No.: 17/297,958

(22) PCT Filed: Dec. 14, 2018

(86) PCT No.: PCT/IB2018/001607
§ 371 (c)(1),
(2) Date: Aug. 13, 2021

(87) PCT Pub. No.: WO2020/121015
PCT Pub. Date: Jun. 18, 2020

(65) Prior Publication Data
US 2022/0020537 A1    Jan. 20, 2022

(51) Int. Cl.
*H01G 11/62* (2013.01)
*H01G 11/32* (2013.01)
*H01G 11/52* (2013.01)

(52) U.S. Cl.
CPC .............. *H01G 11/62* (2013.01); *H01G 11/32* (2013.01); *H01G 11/52* (2013.01)

(58) Field of Classification Search
CPC ......... H01G 11/62; H01G 11/32; H01G 11/52
See application file for complete search history.

(56) References Cited

U.S. PATENT DOCUMENTS

| 4,216,279 A | * | 8/1980 | Mellors | ................... | H01M 4/36 252/182.1 |
| 4,218,527 A | * | 8/1980 | Mellors | ................... | H01M 4/36 252/182.1 |

(Continued)

FOREIGN PATENT DOCUMENTS

| CA | 3000596 A1 | 4/2017 |
| CN | 106783216 A | 5/2017 |

(Continued)

OTHER PUBLICATIONS

ISR for PCT/IB2018/001607, dated Sep. 30, 2019.

(Continued)

*Primary Examiner* — Dion R. Ferguson
(74) *Attorney, Agent, or Firm* — Stites & Harbison PLLC; Richard S. Myers, Jr.

(57) ABSTRACT

This invention relates to electrical engineering. In particular, the invention relates to the design of electrochemical device storing electric energy, and can be used in modern power engineering, for example, in devices storing regenerative braking energy in transport, as traction batteries for electric transport (electric vehicles, hybrid electric vehicles), in emergency power systems when operating in a floating or trickle charge mode. The invention ensures steady operation of this device due to stable preservation of a given concentration of electrolyte components on the electrodes, and improvement of service life in various modes of operation.

9 Claims, 2 Drawing Sheets

(56) References Cited

U.S. PATENT DOCUMENTS

Figure 1:
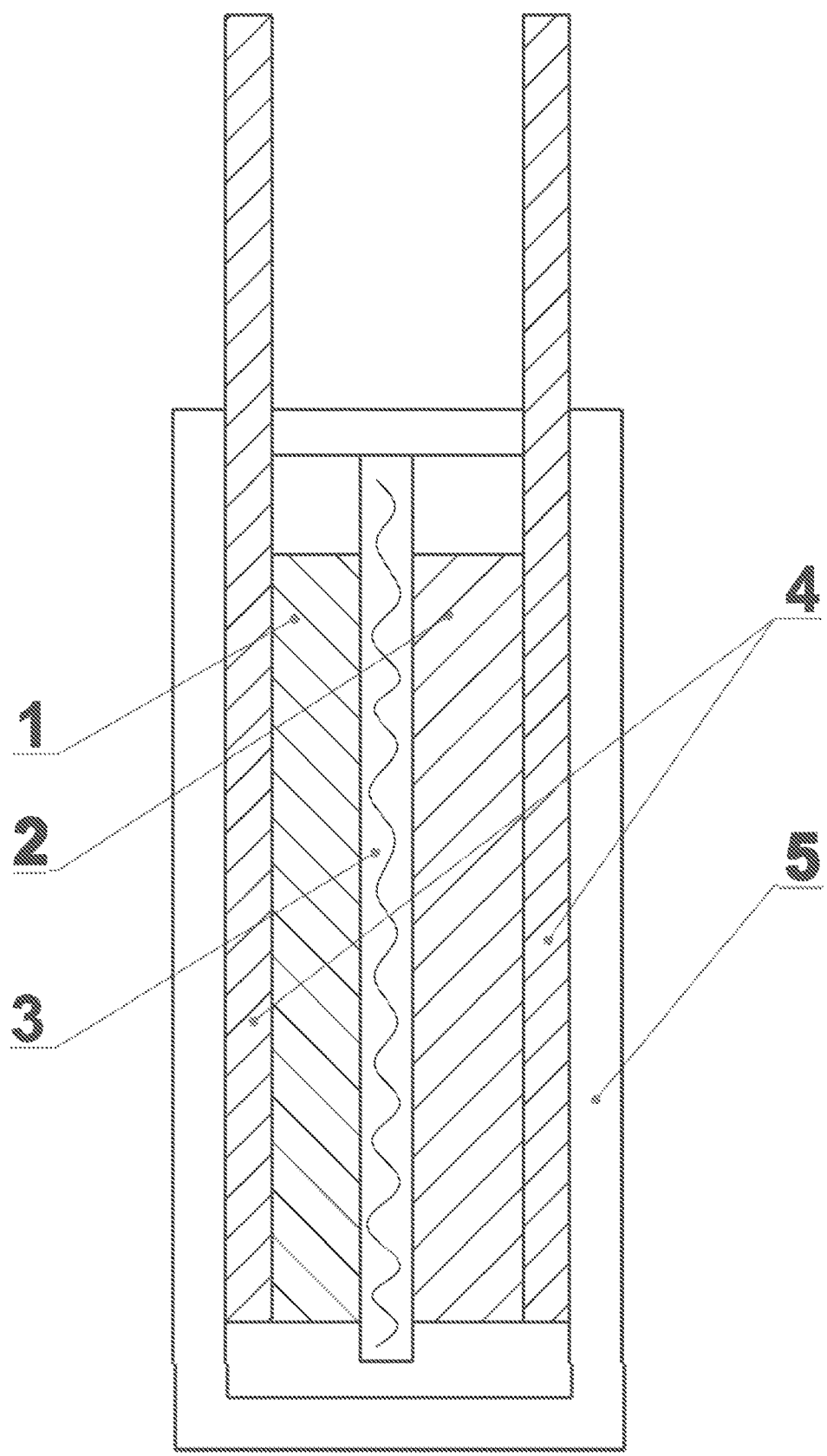

| | | | | |
|---|---|---|---|---|
| 4,592,969 A * | 6/1986 | Coetzer | H01M 4/58 | 429/50 |
| 7,675,737 B1 * | 3/2010 | Smith | H01G 11/58 | 361/523 |
| 7,833,660 B1 | 11/2010 | Zhang | | |
| 8,599,534 B2 | 12/2013 | Farahmandi | | |
| 8,911,612 B2 * | 12/2014 | Freiberg | H01M 12/085 | 205/619 |
| 2005/0123835 A1 * | 6/2005 | Sun | H01M 10/0569 | 429/326 |
| 2012/0218683 A1 * | 8/2012 | Kondou | H01G 11/26 | 361/527 |
| 2013/0277598 A1 * | 10/2013 | Gadkaree | H01G 11/62 | 252/62.2 |
| 2013/0309592 A1 | 11/2013 | Datta | | |
| 2014/0002957 A1 * | 1/2014 | Casasanta, III | H01G 11/48 | 361/502 |
| 2015/0318120 A1 * | 11/2015 | He | C23C 16/46 | 361/502 |
| 2016/0197377 A1 * | 7/2016 | Braun | C07D 231/12 | 429/188 |
| 2016/0218394 A1 | 7/2016 | Yamada et al. | | |
| 2017/0324072 A1 | 11/2017 | Yin | | |
| 2019/0109358 A1 * | 4/2019 | Chai | H01G 11/58 | |

FOREIGN PATENT DOCUMENTS

| | | |
|---|---|---|
| RU | 2140680 C1 | 10/1999 |
| RU | 2014104446 A | 8/2015 |
| RU | 2605911 C2 | 12/2016 |

OTHER PUBLICATIONS

WOISA for PCT/IB2018/001607, dated Sep. 30, 2019.
IPRP for PCT/IB2018/001607, dated Nov. 11, 2020.
Exam Report for CA Application No. 3122910, dated Jul. 23, 2021.

* cited by examiner

ELECTROCHEMICAL DEVICE FOR STORING ENERGY

CROSS REFERENCE TO RELATED APPLICATIONS

This application is a § 371 National State Application of PCT/IB2018/001607 filed Dec. 14, 2018.

FIELD OF INVENTION

This invention relates to electrical engineering. In particular, the invention relates to the design of electrochemical device storing electric energy, and can be used in modern power engineering, for example, in devices storing regenerative braking energy in transport, as traction batteries for electric transport (electric vehicles, hybrid electric vehicles), in emergency power systems when operating in a floating or trickle charge mode.

BACKGROUND

Prior electrochemical energy storage device comprises a housing, with at least two carbon electrodes therein, a separator, arranged between the electrodes, impregnated with aqueous halide electrolyte, and collectors therein (U.S. Pat. No. 8,599,534, international cl. H01G9/155, 2011).

This prior device has several disadvantages, namely:

narrow functionality for energy storage and it can only be used as a hybrid supercapacitor;

it cannot be operated as an electrochemical power source with high specific energy, because faradaic reaction occurs only on one of the electrodes;

it cannot be operated as an electrochemical power source with high specific energy, because active reagent reserve inside the cell—bromine (Br)—is not high enough—less than 5 mol/lit (in examples 1-3 M), and the operating voltage of electrochemical couple does not exceed 1.0 V;

both electrodes are impregnated with the same electrolyte, and its intensive use on one of the electrodes results in "ion starvation" within the operating area of this electrode and diffuse problems because of ion-exchange membrane in its design that conducts only cations (Na+), and always has a high ionic resistance.

Therefore, this electrochemical capacitor cannot be operated as a high-cycling high-power electric double layer capacitor.

Prior high-power electrochemical energy storage device of capacitor type comprises a housing, with at least two carbon electrodes therein, a separator, separating these electrodes, impregnated with aqueous electrolyte, and collectors therein (RF patent No. 2140680, international cl. H01G9/00, 1999).

This capacitor lacks energy store, because when operating with aqueous electrolyte (sodium hydroxide or potassium hydroxide), electrodes made of carbon materials have a real operating voltage of about 1.0 V, and this energy store, that depends on the square of operating voltage, is limited by the electrolyte decomposition voltage and the electrostatic capacitance of electric double layer, that depends on carbon specific surface area.

Therefore, to increase the specific energy of electric double layer capacitors, it is necessary to use expensive and toxic organic electrolytes based on acetonitrile (2.7 V) and special carbon materials with high specific surface area.

The closest device to the proposed one in its technical essence and achieved result is an electrochemical energy storage device, comprising a housing, with two carbon electrodes therein, a separator, arranged between the electrodes, impregnated with aqueous halide electrolyte, characterized in that one electrode is impregnated with aqueous solution of halides of elements of the first, or the second, or the third groups of main subgroups in the periodic system at a concentration of at least 38%, or a mixture thereof, and the second electrode is impregnated with aqueous solution of halides of elements of the second, or the third groups of side subgroups in the periodic system at a concentration of 1-80%, or a mixture thereof, with aqueous solution of sodium bromide or lithium bromide, or a mixture thereof, used as an electrolyte for the first electrode, and aqueous solution of zinc bromide or cadmium bromide, or a mixture thereof, used as an electrolyte, impregnating the second electrode (RF patent No. 2605911, international cl. H01G9/145, 2016).

Use of different electrolytes on different electrodes in an electrochemical energy storage device ensures operation in various modes, which allows the device to operate as an electrochemical power source, a hybrid asymmetric capacitor and an electric double layer capacitor.

However, a substantial deficiency of this system is a significant change in the concentration of electrolytes on the surface of different polarity electrodes that occurs during storage and operation, due to the natural leveling of concentrations of electrolyte components in total volume of a cell.

That is, if there is a 50% lithium bromide solution on the positive electrode, and a 50% zinc bromide solution on the negative one at first, then the concentration of zinc and lithium ions will change over time in an unregulated and uncontrolled manner depending on temperature and operating rate.

The cell of such an electrochemical device may not meet any criteria of charge storage by an electric double layer capacitor, a hybrid electrochemical capacitor, an electrochemical power source.

In addition, if the cells are connected in series, the rate of change of ionogenes surface concentrations will vary, and it will result in cells imbalance in capacitance and internal resistance and failure of series circuit because of a "weak" cell.

Thus, the impregnation of positive and negative electrodes in different solutions may lead to performance degradation and unreliable operation of such an electrochemical device.

DISCLOSURE OF PROPOSED INVENTION

The technical result of the proposed invention is the development of design of an electrochemical energy storage device, ensuring steady operation of this device due to stable preservation of a given concentration of electrolyte components on the electrodes, and improvement of service life in various modes of operation.

The technical result of the proposed invention is achieved by development of an electrochemical energy storage device, comprising a housing, with two carbon electrodes therein, a separator, arranged between the electrodes, impregnated with electrolyte, and collectors, characterized in that, according to the invention, a strong solution with salt concentration of 25-65% is used as an electrolyte, with its cations formed by a mixture of elements of the first, or the second, or the third, or the fourth groups of main subgroups, or any mixture thereof in any combination of groups, main and side subgroups, and anions or polyanions formed of elements of the seventh group of main subgroup in the periodic system.

The selection of cations, anions or polyanions in the electrolyte ensures stable preservation of a given concentration of electrolyte components, with no reduction of cations and anions concentration throughout the service life of the electrochemical device and improves its service life.

In addition, optimal concentration of cations, anions or polyanions improves charging potential and specific energy in the anodic and cathodic regions of the electrochemical device with good conductivity of a strong aqueous electrolyte solution, ensuring high power and ability to operate the device in the mode of an electric double layer capacitor, a hybrid capacitor, an electrochemical power source.

The invention is characterized in that the electrolyte solution is an aqueous solution.

In view of the fact that both aqueous and non-aqueous electrolytes can be used in the device with such electrodes, it is preferable to use (highly conductive) aqueous solutions of inorganic salts.

The solubility of salts used in aqueous solvent is an order of magnitude greater than that in industrial organic solvents that are currently used. High concentration of salts is a guarantee of reliable operation of the device in the mode of an electrochemical power source.

The manufacturing of an electrochemical device with aqueous electrolyte does not require special equipment, dry rooms, the device is technologically effective, less energy consuming and safe during operation.

The invention is characterized in that the aqueous solution of lithium, sodium and cadmium bromides is used as an electrolyte, that allows to manufacture an electrochemical device with operating voltage per cell ranging from 1.0 to 1.6V.

The invention is characterized in that the aqueous solution of calcium, sodium and cadmium bromides is used as an electrolyte, that allows to manufacture an electrochemical device with operating voltage per cell ranging from 1.0 to 1.7V.

The use of calcium bromide allows to reduce the production cost of the electrochemical device.

The invention is characterized in that the aqueous solution of zinc, calcium, and sodium bromides is used as an electrolyte. The use of zinc bromides allows to extend the range of operating voltage per cell up to 1.9V.

The invention is characterized in that the aqueous solution of lithium, sodium and lead bromides is used as an electrolyte, that allows to manufacture an electrochemical device with operating voltage per cell ranging from 1.0 to 1.6 V and make it of generally available materials.

The invention is characterized in that the aqueous solution of lithium, sodium and indium bromides is used as an electrolyte, that allows to manufacture an electrochemical device with operating voltage per cell ranging from 1.0 to 1.65V.

The use of proposed variants of the electrolyte with aqueous solutions of bromides at a concentration of 25-65% ensures a sufficient reserve of reagent for electrochemical reaction on the surface of carbon in the cathodic and anodic regions of potentials.

The use of different variants of cations in electrolyte formed by a mixture of elements of the first or the second, or the third, or the fourth groups of main subgroups, or mixtures thereof in any combination of groups, main and side subgroups, and anions or polyanions formed of elements of the seventh group of main subgroup in the periodic system and selection of the concentration for these elements, enable the design and manufacturing of electrochemical devices on a case-by-case basis based on customer requirements.

The invention is characterized in that a swelling membrane is used as a separator, ensuring ion transport for all types of ions in solution.

This allows to improve electrical characteristics and service life of the device due to sufficient reserve of a multicomponent electrolyte in the separator.

The invention is characterized in that the electrolyte solution is a non-aqueous solution to increase the operating voltage per cell up to 2.5 V.

The selection of cations, anions or polyanions in the electrolyte formed by a mixture of elements of groups, main and side subgroups in the periodic system, ensures optimal and stable concentration of the electrolyte by means of eliminating the quantities reduction of cations and anions on the electrodes during operation of the electrochemical device.

This improves the service life of the device and its steady operation in various modes if it is used in a vehicle (electric vehicle, hybrid electric vehicle, etc.) at the same time as a capacitor with electric double layer for starting of internal combustion engine, as a hybrid electrochemical capacitor for accelerating of a vehicle and as an electrochemical power source for movement and long overtaking.

There have not been identified any technical solutions that coincide with the set of essential features of the claimed invention, so it can be concluded that it complies with such a condition for patentability as "novelty".

The claimed essential features of the claimed invention, predetermining the achievement of the specified technical result, are not obvious from the prior art, so it can be concluded that they comply with such a condition for patentability as "inventive level".

DISCLOSURE OF GRAPHIC MATERIALS

Figure 2:
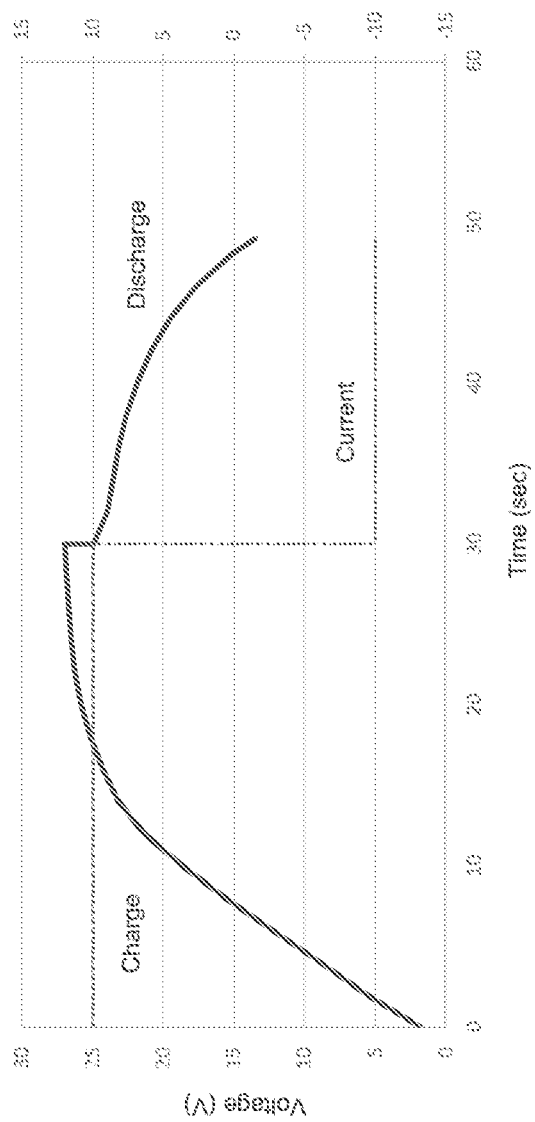

The essence of the claimed electrochemical energy storage device is explained by the following description and drawings, where:

schematic view of the electrochemical device is shown in FIG. 1;

charge-discharge curve for this device at a constant current is shown in FIG. 2.

THE BEST VERSION OF THE PROPOSED ELECTROCHEMICAL ENERGY STORAGE DEVICE

The electrochemical energy storage device has different polarity electrodes (1, 2) made of a carbon material, an ion-permeable separator (3) separating the electrodes, impregnated with electrolyte, and collectors (4).

The internal elements of the device are placed in a housing (5) (FIG. 1).

A swelling membrane can be used as an ion-permeable separator (3).

Depending on technological capabilities and technical tasks, the swelling membrane may be made of cellulose or paper, or of mineral fibers with a binder or in the form of a porous polyethylene or polypropylene film.

Depending on the technological capabilities, the solution at a salt concentration of 25-65% is used as an electrolyte, with cations formed by elements of the first or the second, or the third, or the fourth groups of main subgroups, or mixtures thereof in any combination of groups, main and side subgroups, and anions or polyanions formed of elements of the seventh group of main subgroup in the periodic system.

The electrolyte may be an aqueous solution of calcium, sodium and cadmium bromides or lithium, sodium and cadmium bromides, or an aqueous solution of zinc, calcium and sodium bromides, or an aqueous solution of lithium, sodium and lead bromides, or an aqueous solution of lithium, sodium and indium bromides.

Example 1

The device has different polarity electrodes (1, 2), made of a carbon material, being cards with dimensions of 123× 143 mm, cut out of a carbon woven material such as Busofit T-1. The thickness of the positive (1) and negative (2) electrodes is 200 microns.

The bipolar collector with dimensions of 160×140 mm, made of a conductive film with thickness of 100 microns, produced by Coveris Advanced Coatings, is used as a current collector (4).

The collector (4) is covered with a layer of sealant along the contour. The separator (3) with dimensions of 155×135 mm is made in the form of paper made of mineral fibers with a binder (Bakhit type) with pore size of less than 5 microns.

The electrodes (1, 2) and the separator (3) are impregnated with the electrolyte in the form of aqueous solution of lithium bromide—16%, sodium bromide—16% and cadmium bromide—20%.

The electrochemical energy storage device is optimized as an electric double layer capacitor, a hybrid electrochemical capacitor, and an electrochemical power source.

Characteristics of the electrochemical device are given in Table 1.

Example 2

The electrochemical device manufactured according to design and technology of example 1, characterized in that the electrodes and the separator are impregnated with the electrolyte in the form of aqueous solution of calcium bromide—16%, sodium bromide—16% and cadmium bromide—20%.

The electrochemical energy storage device is optimized as an electric double layer capacitor, a hybrid electrochemical capacitor, and an electrochemical power source.

Characteristics of the electrochemical device are given in Table 1.

Example 3

The electrochemical device manufactured according to design and technology of example 1, characterized in that the electrodes and the separator are impregnated with the electrolyte in the form of aqueous solution of lithium bromide—16%, sodium bromide—16% and zinc bromide—20%.

The electrochemical energy storage device is optimized as an electric double layer capacitor, a hybrid electrochemical capacitor, and an electrochemical power source.

Characteristics of the electrochemical device are given in Table 1.

Example 4

The electrochemical device manufactured according to design and technology of example 1, characterized in that a polypropylene (Celgard) membrane is used as a separator, and the electrodes and the separator are impregnated with the electrolyte in the form of aqueous solution of lithium bromide—16%, sodium bromide—16% and indium bromide—10%.

The electrochemical energy storage device is optimized as an electric double layer capacitor, a hybrid electrochemical capacitor, and an electrochemical power source.

Characteristics of the electrochemical device are given in Table 1.

Example 5

The electrochemical device manufactured according to design and technology of example 1, characterized in that a polypropylene (Celgard) membrane is used as a separator (3), and the electrodes and the separator are impregnated with the electrolyte in the form of aqueous solution of lithium bromide—12%, sodium bromide—12% and lead bromide—2.3%.

The electrochemical energy storage device is optimized as an electric double layer capacitor, a hybrid electrochemical capacitor, and an electrochemical power source.

Characteristics of the electrochemical device are given in Table 1.

Example 6

The electrochemical device manufactured according to design and technology of example 1, characterized in that a polypropylene (Celgard) membrane is used as a separator, and the electrodes and the separator are impregnated with the electrolyte in the form of aqueous solution of calcium bromide—47% and zinc bromide—18%.

The electrochemical energy storage device is optimized as an electric double layer capacitor, a hybrid electrochemical capacitor, and an electrochemical power source.

Characteristics of the electrochemical device are given in Table 1.

Example 7

The electrochemical device manufactured according to design and technology of example 1, characterized in that the electrodes and the separator are impregnated with the electrolyte in the form of aqueous solution of lithium bromide—12% and cadmium bromide—28%.

The electrochemical energy storage device is optimized as an electric double layer capacitor, a hybrid electrochemical capacitor, and an electrochemical power source.

Characteristics of the electrochemical device are given in Table 1.

Example 8

The electrochemical device manufactured according to design and technology of example 1, characterized in that the electrodes are made of carbon woven material of Busofit T type, and the electrodes and the separator are impregnated with the electrolyte in the form of aqueous solution of calcium bromide—20%, sodium bromide—3% and zinc bromide—2%.

The electrochemical energy storage device is optimized as an electric double layer capacitor, a hybrid electrochemical capacitor, and an electrochemical power source.

Characteristics of the electrochemical device are given in Table 1.

Example 9

The electrochemical device manufactured according to design and technology of example 1, characterized in that the electrodes are made of carbon woven material of Busofit T type, and the electrodes and the separator are impregnated with the electrolyte in the form of aqueous solution of calcium bromide—18%, sodium bromide—3% and zinc bromide—2%.

The electrochemical energy storage device is optimized as an electric double layer capacitor, a hybrid electrochemical capacitor, and an electrochemical power source.

Characteristics of the electrochemical device are given in Table 1.

Example 10

The electrochemical device manufactured according to design and technology of example 1, characterized in that a polypropylene (Celgard) membrane is used as a separator (3), and the electrodes (1,2) and the separator (3) are impregnated with the electrolyte in the form of aqueous solution of calcium bromide—16%, sodium bromide—16% and cadmium bromide—20%.

The electrochemical energy storage device is optimized as an electric double layer capacitor, a hybrid electrochemical capacitor, and an electrochemical power source.

Characteristics of the electrochemical device are given in Table 1.

Example 11

The electrochemical device manufactured according to design and technology of example 1, characterized in that a swelling membrane made of cellulose film is used as a separator (3), and the electrodes and the separator are impregnated with the electrolyte in the form of aqueous solution of calcium bromide—16%, sodium bromide—16% and cadmium bromide—20%.

The electrochemical energy storage device is optimized as an electric double layer capacitor, a hybrid electrochemical capacitor, and an electrochemical power source.

Characteristics of the electrochemical device are given in Table 1.

Example 12

The device has different polarity electrodes (1, 2), made of a carbon material, being cards with dimensions of 80×96 mm, cut out of a carbon woven material such as Busofit T-1. The thickness of the positive (1) and negative (2) electrodes is 200 microns.

The bipolar collector with dimensions of 90×107 mm, made of a graphite foil with thickness of 200 microns is used as a current collector (4). The collector (4) is covered with a layer of sealant along the contour.

The separator with dimensions of 84×100 mm is made in the form of paper made of mineral fibers with a binder (Bakhit type).

The electrodes and the separator are impregnated with the electrolyte in the form of non-aqueous solution of 35% zinc bromide and 1.1% bromine in propylene carbonate.

The electrochemical energy storage device is optimized as an electric double layer capacitor, a hybrid electrochemical capacitor, and an electrochemical power source.

Characteristics of the electrochemical device are given in Table 1.

Typical charge-discharge curves for a 27 V device with a three-component electrolyte consisting of: 16% Ca, 16% Na, 20% Cd are shown in FIG. 2.

Electric double layer formed of hydrated ions $Na^+$, $Ca^+$ and partially $Cd^{++}$ on the negative (2) electrode, and of hydrated ions Br on the positive (1) electrode is charged at the linear section of charge-discharge curve within the voltage range of 2-20 V.

Then the knee of charge-discharge curve within the voltage range of 20-25 V indicates the faradaic reaction that occurs on the positive electrode:

$$3Br^- - 2\bar{e} \rightarrow Br^{3-}$$

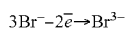

The device becomes "hybrid" within this voltage range, i.e. there is a redox reaction on one of the electrodes, and the electrical double layer is charged on the other.

There is an additional linear section on charge-discharge curve at 25-27V, corresponding to the start of faradaic reaction on the negative electrode, characterized by partial reduction of ions $Cd^{++}$:

$$2Cd^{++} + 2\bar{e} \rightarrow Cd^+ \cdot Cd^+$$

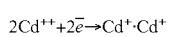

Thus, the device has all the features of an electrochemical power source, i.e. electrochemical reactions behavior on both electrodes at the operating voltage of 27V.

The device is discharged in reverse order of reactions and processes. However, in practice all 3 processes can start simultaneously, occurring to different extents at different sections of charge-discharge curve.

According to the experimental test results of the proposed device given in Table 1, it can be concluded that this electrochemical device allows to keep the required concentration of the reagent on the electrode surface, thus ensuring steady operation of the device when operating in various modes.

In this case, when the concentration of salt solution is less than 25% (Example 9), the electrical characteristics decrease.

When the concentration of salt solution is more than 65%, the solution crystallizes, thus precluding its use.

The use of a swelling membrane as a separator (3) results in increased electrical characteristics.

Thus, the claimed electrochemical energy storage device complies with such a condition for patentability as "industrial applicability".

The proposed design of the electrochemical energy storage device, if compared to the prototype, has a higher service life, it is more stable in various modes of operation due to stable preservation of a given concentration of electrolyte components on the electrodes when operating as an electrochemical power source, a hybrid capacitor and an electric double layer capacitor.

TABLE 1

Characteristics of the electrochemical devices, specified in examples

| Example No. | Charge current, A | Discharge current, A | Voltage, V | Capacitance, F | Energy stored, kJ/kg | ESR, mOhm | Operation |
| --- | --- | --- | --- | --- | --- | --- | --- |
| Example 1 | 20 | 10 | 1.6 | 1290 | 91.7 | 2.1 | Electric double |
| Example 2 | 20 | 10 | 1.6 | 1200 | 84.8 | 1.53 | layer capacitor |
| Example 3 | 20 | 10 | 1.85 | 960 | 88.8 | 1.75 | Hybrid |
| Example 4 | 5 | 5 | 1.6 | 720 | 63.4 | 5.8 | electrochemical |
| Example 5 | 5 | 5 | 1.6 | 300 | 25.3 | 2.6 | capacitor |
| Example 6 | 20 | 10 | 1.9 | 535 | 48.3 | 3.9 | Electrochemical |
| Example 7 | 20 | 10 | 1.6 | 1412 | 95.0 | 2.37 | power source |
| Example 8 | 10 | 10 | 1.8 | 360 | 28.4 | 2.5 | |
| Example 9 | 10 | 10 | 1.8 | 240 | 21.6 | 2.7 | |
| Example 10 | 20 | 10 | 1.6 | 975 | 67.4 | 2.1 | |
| Example 11 | 20 | 10 | 1.6 | 1500 | 96.0 | 5.4 | |
| Example 12 | 5 | 0.5 | 2.3 | 42 | 17.7 | 93.8 | |

The invention claimed is:

1. Electrochemical energy storage device, comprising a housing, with two carbon electrodes therein, a separator, arranged between electrodes, impregnated with electrolyte, and collectors, wherein a solution with salt concentration of 25-65% is used as an electrolyte, with its cations formed by a mixture of elements each independently selected from any of the main or side subgroups of the first or the second, or the third, or the fourth groups, and anions or polyanions formed of elements of the seventh group of main subgroup in the periodic system.

2. Electrochemical energy storage device according to claim 1, wherein electrolyte solution is an aqueous solution.

3. Electrochemical energy storage device according to claim 1, wherein aqueous solution of calcium bromide, sodium bromide and cadmium bromide is used as an electrolyte.

4. Electrochemical energy storage device according to claim 1, wherein aqueous solution of lithium bromide, sodium bromide and cadmium bromide is used as an electrolyte.

5. Electrochemical energy storage device according to claim 1, wherein aqueous solution of zinc bromide, calcium bromide and sodium bromide is used as an electrolyte.

6. Electrochemical energy storage device according to claim 1, wherein aqueous solution of lithium bromide, sodium bromide and lead bromide is used as an electrolyte.

7. Electrochemical energy storage device according to claim 1, wherein aqueous solution of lithium bromide, sodium bromide and indium bromide is used as an electrolyte.

8. Electrochemical energy storage device according to claim 1, wherein swelling membrane is used as a separator.

9. Electrochemical energy storage device according to claim 1, wherein electrolyte solution is a non-aqueous solution.

* * * * *